(12) United States Patent
Sundholm

(10) Patent No.: US 11,392,888 B2
(45) Date of Patent: Jul. 19, 2022

(54) ELECTRONIC PRICE, INVENTORY MANAGEMENT AND LABEL SYSTEM

(71) Applicant: MARIELLA LABELS OY, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 15/768,769

(22) PCT Filed: Sep. 26, 2016

(86) PCT No.: PCT/FI2016/050671
§ 371 (c)(1),
(2) Date: Apr. 16, 2018

(87) PCT Pub. No.: WO2017/064365
PCT Pub. Date: Apr. 20, 2017

(65) Prior Publication Data
US 2018/0308041 A1 Oct. 25, 2018

(30) Foreign Application Priority Data
Oct. 16, 2015 (FI) ...................................... 20155739

(51) Int. Cl.
*G06Q 10/08* (2012.01)
*G06Q 30/06* (2012.01)
(Continued)

(52) U.S. Cl.
CPC ......... *G06Q 10/087* (2013.01); *G06K 7/0008* (2013.01); *G06Q 30/0283* (2013.01); *G06Q 30/0639* (2013.01); *G06Q 50/28* (2013.01)

(58) Field of Classification Search
USPC .................................. 705/16; 235/375, 385
See application file for complete search history.

(56) References Cited

U.S. PATENT DOCUMENTS 7,152,040 B1 * 12/2006 Hawthorne .......... G06Q 10/087
705/14.1
2002/0109593 A1 * 8/2002 Swartzel .............. G06Q 10/087
340/572.1
(Continued)

FOREIGN PATENT DOCUMENTS

EP 1 693 788 A2 8/2006
FI 20050192 A 8/2006

OTHER PUBLICATIONS

International Search Report for PCT/FI2016/050671 dated Dec. 23, 2016.
(Continued)

*Primary Examiner* — Fahd A Obeid
*Assistant Examiner* — Reva R Moore
(74) *Attorney, Agent, or Firm* — Birch, Stewart, Kolasch & Birch, LLP

(57) ABSTRACT

A method for an electronic price, inventory management and label system and an electronic price, inventory management and label system, which comprises an electronic label system, comprising at least one base station and electronic labels, which are configured to communicate with the base station using two way communication. The system further comprises means for reading remotely readable tags, such as RFID-tags, wherein remotely readable tags are attached to products and wherein certain electronic label is linked to remotely readable tag(s) of certain product(s). The system is configured to detect the number of certain product in a space by using the means for reading remotely readable tags, and the system is configured to identify the location of these products based on the location of the electronic label linked to the product.

32 Claims, 7 Drawing Sheets

(51) Int. Cl.
*G06Q 50/28* (2012.01)
*G06K 7/00* (2006.01)
*G06Q 30/02* (2012.01)

(56) References Cited

U.S. PATENT DOCUMENTS

| | | | | |
|---|---|---|---|---|
| 2002/0139838 A1* | 10/2002 | Goodwin, III | ......... | G06Q 30/06 235/375 |
| 2004/0099735 A1* | 5/2004 | Neumark | ............ | G06Q 10/087 235/385 |
| 2009/0179825 A1 | 7/2009 | Enarvi et al. | | |
| 2010/0161435 A1 | 6/2010 | Shimizu et al. | | |
| 2013/0210364 A1* | 8/2013 | Mayor | ................... | H04B 15/04 455/63.1 |

OTHER PUBLICATIONS

Written Opinion of the International Searching Authority for PCT/FI2016/050671 dated Dec. 23, 2016.
Finnish Search Report for Finnish Application No. 20155739, dated Mar. 2, 2016.

* cited by examiner

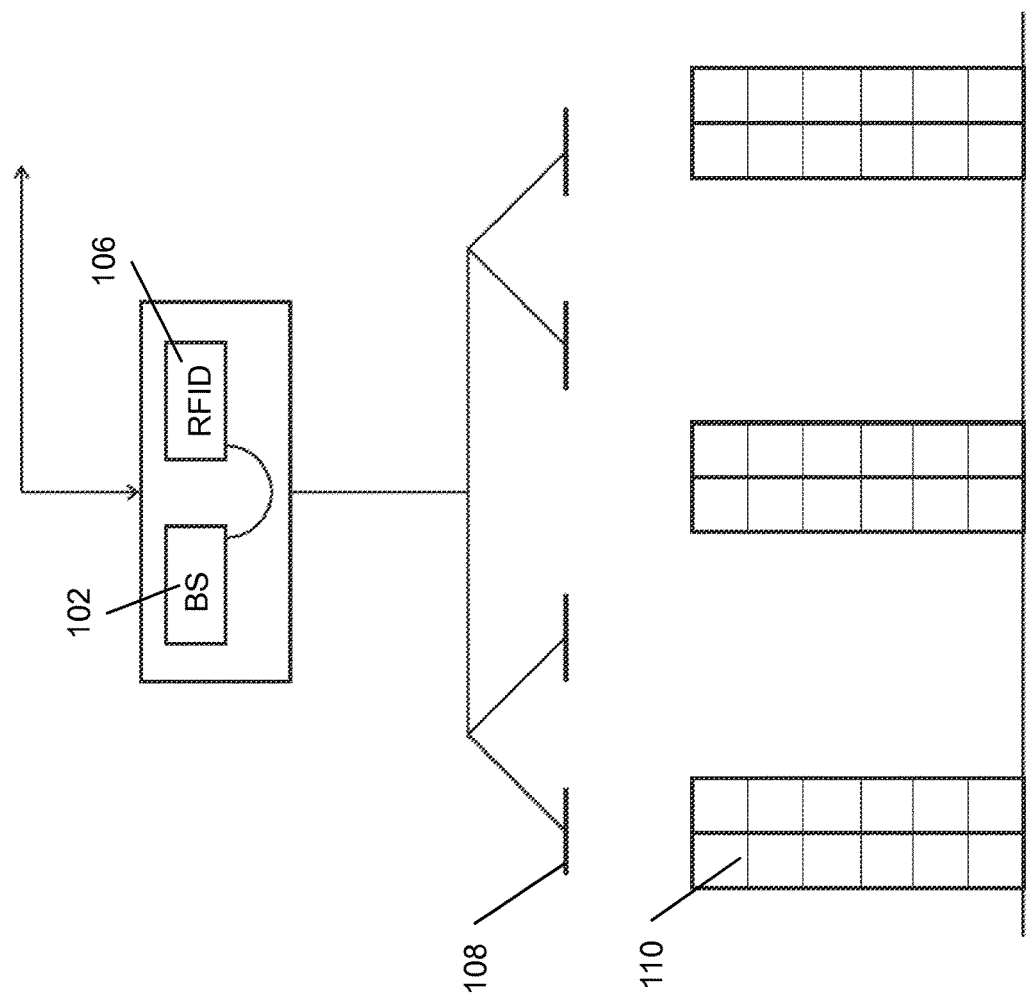

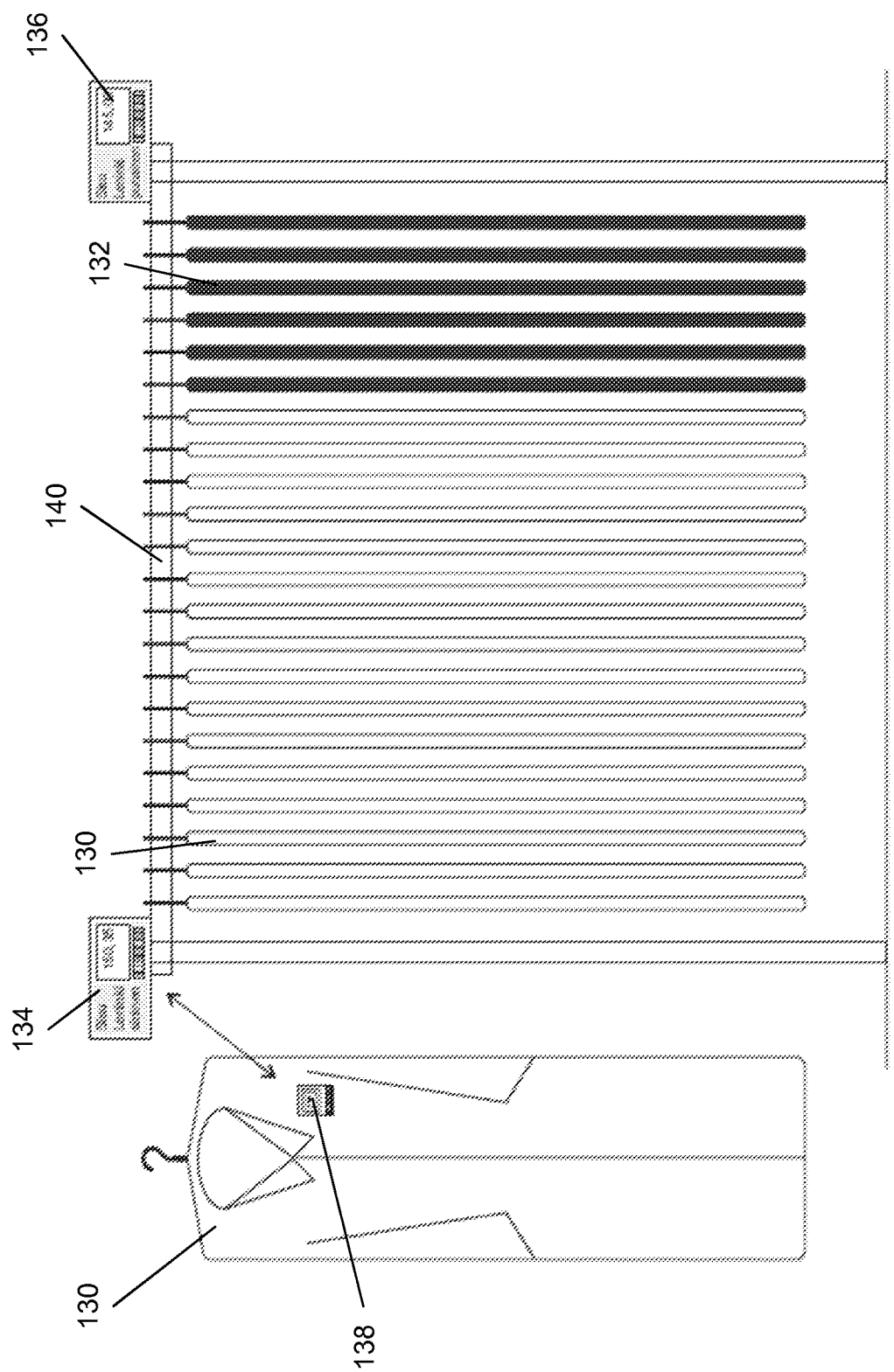

ELECTRONIC PRICE, INVENTORY MANAGEMENT AND LABEL SYSTEM

FIELD OF THE INVENTION

The invention relates to electronic price, inventory management and label systems and methods.

BACKGROUND OF THE INVENTION

Conventionally, the price information on price tags in shops is always changed manually when the price of the product is changed. The new prices are printed out on paper or a corresponding material, and these tags with their new price markings are placed manually to the products in the sales premises. Thus, an employee must first find the correct product and the price tag to be updated, after which the new price tag is inserted in its position. A disadvantage in this arrangement is, among other things, the fact that the arrangement is very laborious and there is a high risk of mistakes. In case of a mistake, a situation may, for example, occur, in which the price information on the price tags on the products conflicts with the price information in the cash register system.

To avoid the above mentioned drawbacks, electronic systems have been developed, in which electronic labels and their electronic displays are attached to the products, in which the price information of the products can be changed in a centralized manner from the control centre of the system, or the like. This will facilitate and accelerate the updating of the price information to a significant extent.

Also wirelessly readable Radio-frequency identification RFID-tags are known in the prior art. The tags contain electronically stored information. Some tags are powered by electromagnetic induction from magnetic fields produced near the reader. Some types collect energy from the interrogating radio waves and act as a passive transponder. Other types have a local power source such as a battery and may operate at hundreds of meters from the reader. Unlike a barcode, the tag does not necessarily need to be within line of sight of the reader and may be embedded in the tracked object.

Also Point-of-Sale (POS) systems are used in the retail environment. The POS-systems of the prior art are used in various retail situations and they are implemented with hardware and software tailored to their particular requirements. Retailers may utilize weighing scales, scanners, electronic and manual cash registers, EFTPOS terminals, touch screens and a variety of other hardware and software available. POS software may also include additional features to cater for different functionality, such as inventory management, CRM, financials, warehousing, etc.

It's also known to use inventory or stock control systems in retail environment. Typical features of stock control systems include e.g. ensuring that the products are on the shelf in shops in just the right quantity, recognizing when a customer has bought a product, signaling when more products need to be put on the shelf from the stockroom, reordering stock at the appropriate time from the main warehouse, producing management information reports that could be used both by the store and also at head office.

With above described prior art systems it's not possible to provide detailed information about the products and their statuses and e.g. information about which products are in the store and which products are outside the store e.g. in a warehouse and/or what is the location of the products present in the store.

SUMMARY OF THE INVENTION

It is an aim of the present invention to reduce the above-mentioned problems and simultaneously provide an arrangement for an electronic price, inventory management and label system.

The system according to the invention is presented in claim 1 and the method according to the invention is presented in claim 15. Other embodiments of the invention are characterized in what will be presented in the other claims.

The idea of the invention is to provide an electronic price, inventory management and label system which comprises an electronic label system, comprising at least one base station and electronic labels, which are configured to communicate with the base station using two way communication. The system also comprises means for reading remotely readable tags, such as RFID-tags, which remotely readable tags are attached to products. In the solution of the invention certain electronic label is linked to remotely readable tag(s) of certain product(s). The system is configured to detect the number of certain product in a space by using the means for reading remotely readable tags, and to identify the location of these products based on the location of the electronic label linked to the product.

In one embodiment of the invention information about location of an electronic label is stored in to the system.

In one embodiment of the invention the base station of the electronic label system comprises means for reading remotely readable tags and/or the base station is connected to means for reading remotely readable tags.

In one embodiment of the invention the means for reading remotely readable tags is a separate unit from the base station of the electronic price label system.

In one embodiment of the invention the base station of the electronic label system comprises means for reading remotely readable tags and/or wherein means for reading remotely readable tags are comprised in the same unit with the base station.

In one embodiment of the invention means for reading remotely readable tags is configured to use the antenna of the base station of the electronic price label system.

In one embodiment of the invention means for reading remotely readable tags is an RFID-reader.

With the solution of the invention it's possible to have a system which is able to provide detailed information about the products and their statuses, e.g. how many products are in the store and/or how many products are outside the store, e.g. in warehouse and at which location specific products are in the store and/or warehouse. Another benefit of the invention is that the functionality of the invention can be implemented to existing electronic label systems with relatively light modifications.

DESCRIPTION OF THE DRAWINGS

In the following, the invention will be described in more detail by means of an embodiment example with reference to the appended drawings, in which FIG. 1A presents a schematic and simplified view of an example arrangement of the electronic label system in a store or in corresponding sales premises, FIG. 3 presents another example embodiment of the invention arranged to the sale premises.

DETAILED DESCRIPTION OF THE INVENTION

Figure 1B:
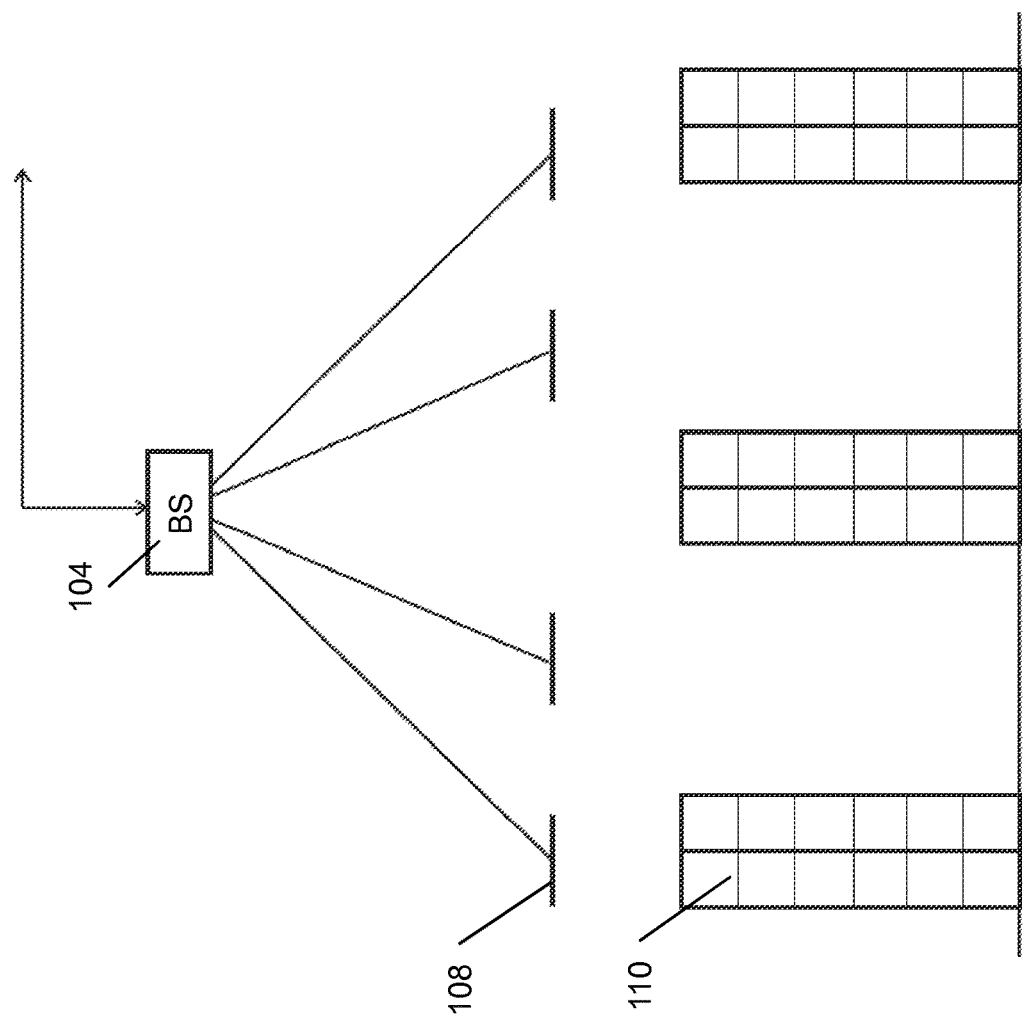
FIG. 1B presents another schematic and simplified view of an example arrangement of the electronic label system in a store or in corresponding sales premises

The idea of the invention is to provide an electronic price, inventory management and label system which comprises an electronic label system, comprising at least one base station and electronic labels, which are configured to communicate with the base station using two way communication. The system also comprises means for reading remotely readable tags, such as RFID-tags, which remotely readable tags are attached to products. In the solution of the invention certain electronic label is linked to remotely readable tag(s) of certain product(s) The system is configured to carry out an inventory check by detecting the number of certain product in a space by using the means for reading remotely readable tags, and by identifying the location of these products based on the location of the electronic label linked to the product.

In the solution of the invention the location information of the electronic label is used to determine the location of the products having RFID-tags. In one embodiment of the invention information about location of an electronic label is stored in to the system. In one embodiment of the invention the location of the electronic label can be determined e.g. based on the location of the base station which communicates with the electronic label.

In the solution of the invention the electronic labels are linked to the products and/or their RFID-tags attached to products on system level. The electronic labels have a unique identification code and this code can be used to link products and electronic labels. The electronic label can e.g. be linked to the product number such as EAN or GTIN in the system.

The electronic price label and RFID-tag can be linked together e.g. by first reading the ID of the electronic price label and then identification information of the RFID-tag which is attached to a certain product having e.g. a certain EAN/GTIN-code.

The system stores the relationship between a certain product and electronic price label and RFID-tags linked to the product. The relationship between a certain product and electronic price label and RFID-tags linked to the product can be stored to a database. Also the location of the electronic price label and how many products are at most linked to specific electronic price label can be stored to the system e.g. to the database.

When a user device or an external system wants to receive information about a certain product or plurality of products or the inventory status of the store is wanted to be updated, the user device or external system can request desired actions form the system. The electronic price, inventory management and label system receives the request and as a response to the query the system may perform an inventory check and send the results to user device and update information on electronic labels.

Also electronic price label can be used to start inventory check for certain product. In this case information, e.g. bar code, or other information, about the electronic price label can be read, e.g. with a scanner, and an inventory check for products relating to this electronic label can be requested.

The electronic price, inventory management and label system can be scheduled to automatically make an inventory check for all the products in the store e.g. periodically. This way reliable inventory information of all products in the store and/or warehouse is available. This information is much more reliable than with the prior art systems where the inventory is usually manually checked once or twice the year.

Inventory check can be done many times a day to e.g. help the personnel of the store to see which shelfs need more products. This inventory check may not be totally accurate because during daytime there are many interference sources, but this kind of inventory check helps the personnel to see the status of the products in the store as quickly as possible. Interference can be caused e.g. by customers walking in the shop and products being moved in the shop. A more accurate inventory check which covers the whole store and/or warehouse may be done e.g. automatically once a day, for example during night time so that there is as little interference as possible and exact information about the number and status of products can be obtained.

The system can perform inventory check e.g. in such a way that the system starts determining status of all products or certain products. The RFID-reader scans RFID-tags in the store and reports the results to the system. The system stores information about the found rags and records/informs to which products the tags are related and how many products of certain type there are in the store. This way a precise inventory check can be carried out always when it's needed. This kind of inventory check can be fully automatic. The inventory check can be carried out e.g. for the products in the store and/or the warehouse.

In one embodiment of the invention when the system is reading the number of RFID-tags, the transmissions of the electronic labels can be stopped or they can be stopped before or when the system starts reading RFID-tags attached to the products. The inventory check can be carried out e.g. such that first it's checked whether the electronic price label system is used. If it is, it is switched off temporarily and the RFID-reader is allowed to transmit. After the inventory check the electronic price label system can be activated and allowed to continue transmissions again. This can be the case e.g. when the electronic label system operates in same frequency range as the means for reading RFID-tags, the operations create interference to each other or when RFID-tag reading is done with the base station of the electronic label system and/or antennas of the electronic base station system.

In one embodiment of the invention the RFID-reading and transmissions of the electronic labels can be done simultaneously. This can be the case e.g. if different frequency range is used for reading RFID-tags and transmissions of the electronic label system.

The RFID-tag reading can be done with one RFID-reader from the coverage area corresponding the coverage area of one base station of the electronic label system and/or the whole store or warehouse. If the area of the store or warehouse is large, it may be necessary to read the RDIF-tags with many RFID-readers cover the area of the whole store and/or warehouse.

FIG. 1A presents a schematic and simplified view of an example arrangement of the electronic label system in a store or in corresponding sales premises. In this example the base station 102 of the system is connected to an RFID-reader 106. The base station and RFID reader can be separate units connected with each other using wired or wireless connection means, such as USB-connection, or the base station and RFID reader can be located in the same unit and/or enclosure. The base station 102 is connected to at least one antenna 108 which is used while transmitting and receiving information to and from electronic labels located in proximity of the shelfs 110. The same antenna 108 can be used by the RFID-reader 106.

FIG. 1B presents otherwise a similar arrangement as in FIG. 1A but in this example embodiment the RFID-reader functionality is included in the base station 104 of the electronic label system.

The electronic labels of the system communicate in a wireless manner with the base station 104 shown in FIGS. 1A and 1B. This wireless communication method may be based on any known wireless communication technology such as two way radio communication or infrared communication. In one embodiment passive backscatter radio communication is used. In this approach the base stations actively send radio signals and instead of answering with active radio transmission, the electronic labels do not use a radio transmitter; instead, they answer by modulating the reflected power of the base station signal. The modulation is achieved, typically, by changing the load state of the antenna in the electronic labels, for example, by connecting and disconnecting the antenna between the ground and non-ground potential. This modulation of the backscattered signal allows for the electronic labels to answer to the base stations and further to the store level server.

Each electronic label can be identified by its own identification code that the electronic label in question knows to listen for in the transmission from the base station. After receiving new information, instructions or commands from the store server via base station, the electronic label can acknowledge the reception of these instructions by using the reflected backscattering modulated properly and timely for the store level server to identify that the response is coming from the electronic label is question. To facilitate that the store server may have a certain listening period after a transmission directed to a certain electronic label for giving the module possibility to answer during that time.

Figure 2A:
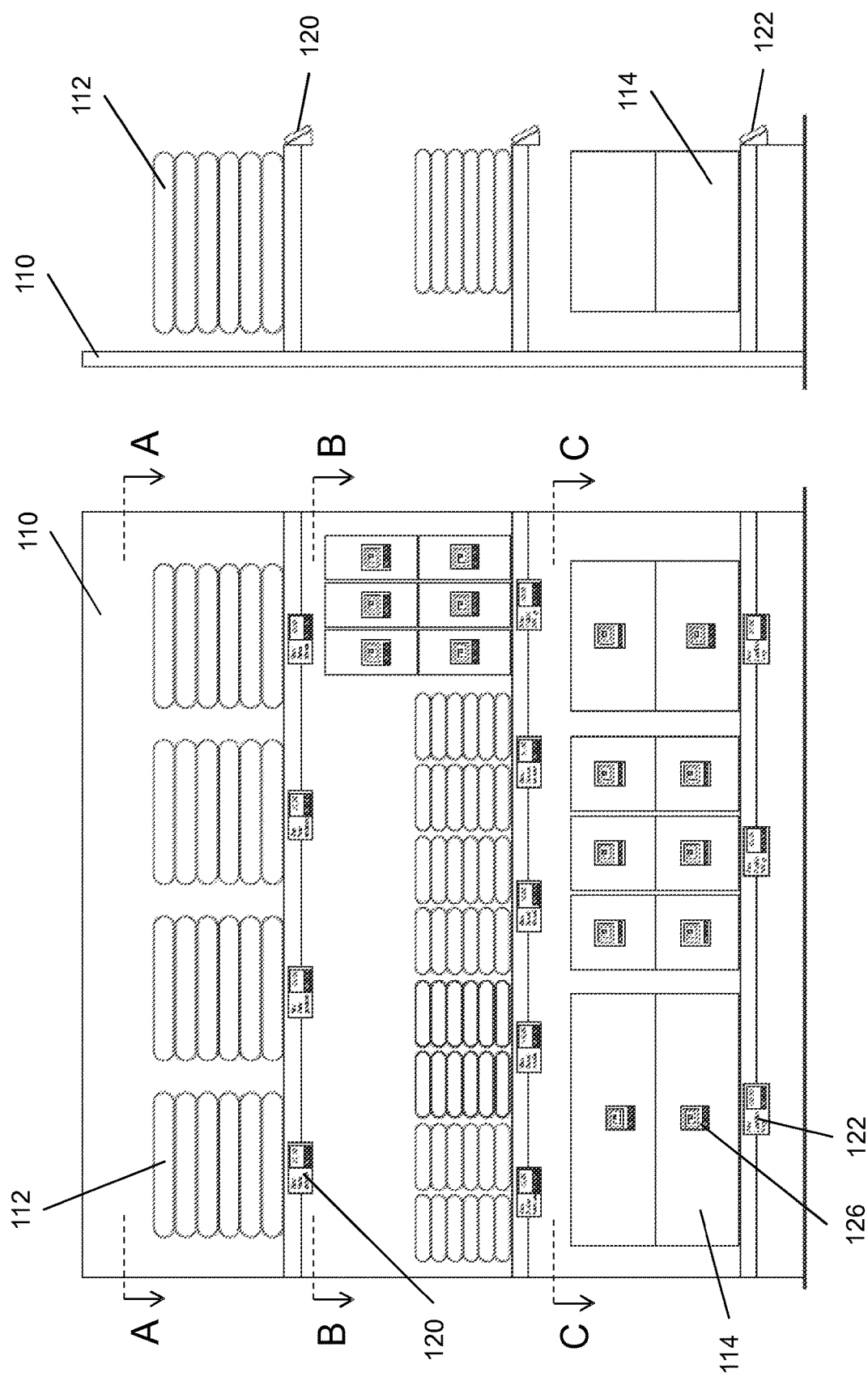
FIGS. 2A and 2B present an example embodiment of the invention arranged to the sale premises.
Figure 2B:
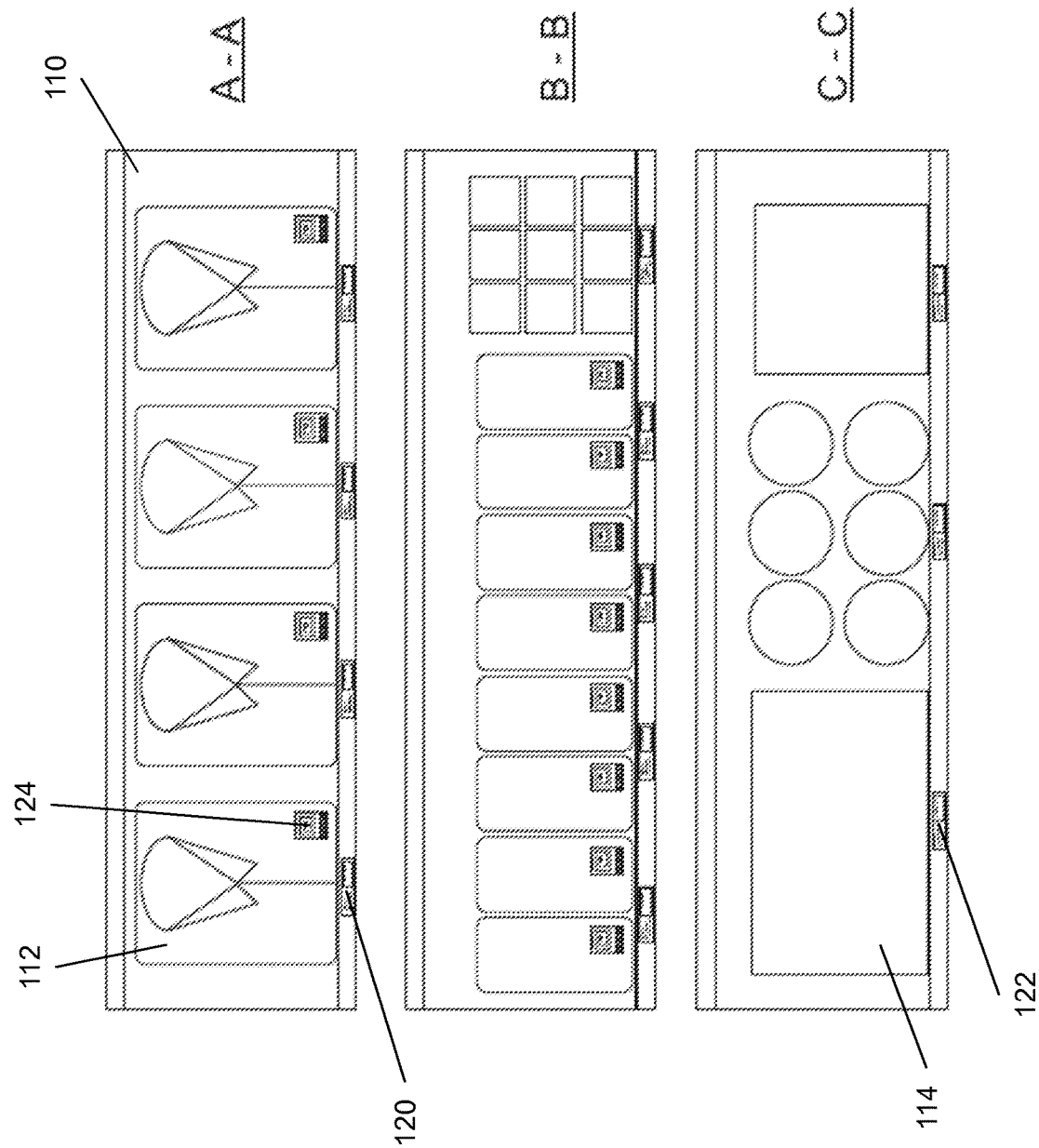

FIGS. 2A and 2B show schematically, as an example, a typical arrangement of system in a store or similar sale environment. In FIG. 2A the shelf is presented from front side of the shelf and from side of the shelf and in FIG. 2B above of the shelf. Electronic labels 120, 122 which comprise a display are arranged in the proximity of products 112, 114. Products can be arranged e.g. to shelves and the products can be equipped with an RFID-tag 124, 126. The electronic labels 120, 112 are typically attached to the shelves with different kind of fixing means or as hanging labels (not shown). The display is arranged to display product related information, e.g. the price of the product, the name of the product, number of products at the shelf and/or number of products at the warehouse and possibly some other information relating to the product. The electronic price label can also have a separate indication marking, e.g. color-marking, which can indicate product related information such as a sale promotion for the product, sale promotion to regular customers for the product and/or a new product.

Each electronic display can constitute a thin tag equipped with display segments and/or pixels and resembling a paper price tag, in which the required product prices and other necessary symbols are formed by changing the color of the substantially two-colored or multicolored display segments.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192.

The electronic labels can have multiple memory locations for the information, for example for price information. The electronic price label can also have many different display options, e.g. different pages that include different information to be displayed. This information can be shown in the display and the electronic label and can present e.g. in the main page or other pages the number of products in the warehouse. In this way the customer/personnel is able to know if it's possible to get a product not available in the shelf from the warehouse. It's also possible to show information in the display of the electronic price label about the number of products in the shelf based on the RFID-query. This number from RFID-query can be compared e.g. by the store personnel, with the real number of products which can be observed at the location of the shelf to check that the products are in correct place.

The electronic labels of the system are able to indicate different statuses to the personnel of the store and/or customers. The indication can be done e.g. by changing colors of the display, e.g. by inverting the colors, flickering the display, by lighting up a light source, displaying a message and/or displaying a symbol.

FIG. 3 presents another example embodiment of the invention arranged to the sale premises. In this example different clothes 130, 132 are arranged to a cloth rack 140. The clothes 130, 132 can be different types, colors and/or sizes. Electronic labels 134, 136 are arranged in the proximity of the clothes 130, 132.

With the system of the present invention it's possible to determine how many certain type of clothes there are in the rack or shelf based on the RFID-tag 138 on the product and electronic label linked to this RFID-tag of certain product. The determined number of certain products can be presented also in the electronic label. In case of clothes it can be determined that what is the total number of certain clothes having certain color and certain size and this information can be presented in the display of the electronic label. It's also possible to send information to the electronic price label about different sizes and colors of the product (for e.g. clothes) determined in inventory check and the electronic price label can present this information in the display so that the customers or the store personnel are able to see, e.g. how many cloths there are for certain size, etc. In the example of FIG. 3 the electronic label can display different available sizes in display of the electronic label. In one embodiment of the invention an alarm can made when the number of certain type of product, e.g. certain color and/or size, is under the desired level, e.g. so that the store personnel can take a new product from the warehouse to the store so that the total number of certain type of products is at the desired level. This can happen e.g. when someone purchases a product which can be detected by POS-system and/or by RFID-reading.

The system can have also other alarms and/or notifications and alarms and/or notifications can be created in different circumstances. In general the electronic price label can indicate e.g. in its display that the criteria measured for the products is under the set alarm and/or notification limit. The limit can be e.g. certain number of products in the warehouse, certain number of products in the store shelf and/or certain delivery date. An alarm limit can be set for the number of products in the shelf and if the limit is not reached in the inventory check the system can create an alarm that more products should be taken to the shelf.

Figure 4:
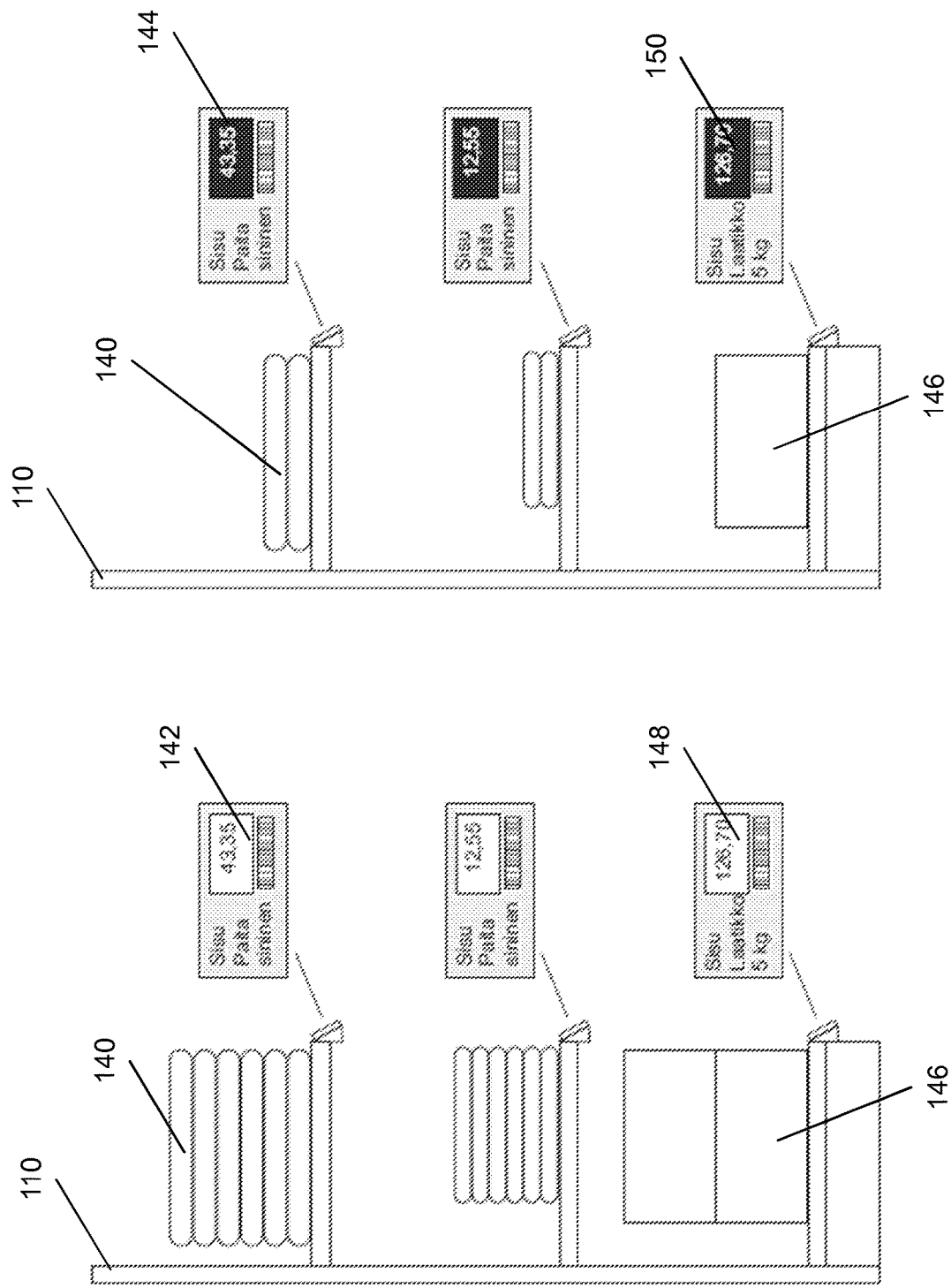
FIG. 4 presents another example embodiment of the invention arranged to the sale premises in a case where the electronic labels are used to present an indication to the users.

The electronic price label, which has products related to itself which have total number of products under the specified limit, can indicate this to the store personnel as described, e.g. by changing color, flickering the display or by lighting up a light source. This example is presented in FIG. 4 where products 140, 146 are on the shelf 110 and corresponding electronic labels are attached to the shelf in proximity of the products. When the number of products in the shelf is within the specified limits, the displays of the electronic labels are in normal mode 142, 148 having normal colors. If the number of products is lower than desired the displays can indicate this. In the FIG. 4 this indication is done by inverting the colors of the displays and the displays are in indication mode 144, 150.

Also an alarm and/or notification can be provided, e.g. to the system or handheld device, that the certain products don't meet the set alarm and/or notification limit(s). Information can also be provided to the system and/or handheld device about the location of the products and/or number of products needed in the shelf so that the set limit is met or that there are correct number of products in the shelf.

Figure 5:
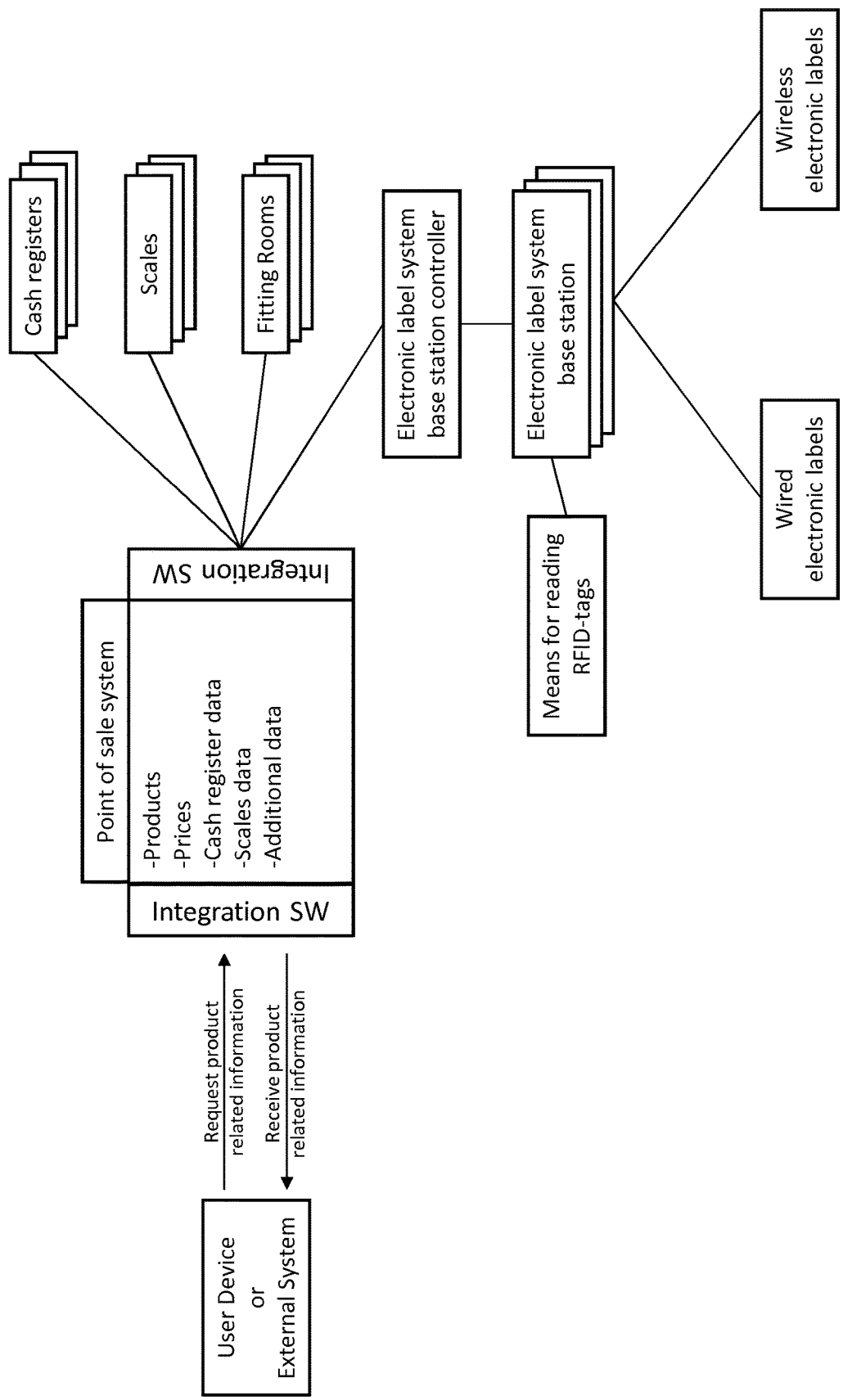
FIG. 5 shows a schematic and simplified view of an example arrangement of the electronic label system used in a store or in corresponding sales premises.

FIG. 5 presents an example environment where the present invention can be used. The electronic price, inventory management and label system according to the invention can also comprise a point of sale system or be connected to a point of sale system.

Point of sale system is used to manage prices, stock, scales data, cash register data or other similar sale or product related data of a store. A user device can communicate with the point of sale system of a store through an interface. The point of sale system can be connected through an interface also to cash registers, scales and an electronic price label system. Trough the interface the point of sale system can e.g. update information on cash registers and scales or gather information on activities such as sales on the cash registers or scales.

The electronic label system, connected to the point of sale system, as discussed earlier, can be used to change and present prices to the customers. The electronic price label system comprises electronic price label system base station controller, one or more base stations and one or more electronic price labels. Base stations of the electronic price label system are installed in stores and are typically connected in a wired manner, for example, via Ethernet connection to the base station controller. The base station controller is further connected to a store level server containing the price and other product information.

Furthermore, the electronic label system comprises at least a central processing unit connected to a base station or other communication means, via which it is possible to transmit, for example, updated price information and other control information to the display. Furthermore, the system may comprise scanners located at cash registers and connected to the cash register system, for scanning the price, wherein the cash register system and the electronic labels always have the same up-to-date information on the prices of the products. Furthermore, the central processing unit may be coupled to other controlling and supporting systems, e.g. to a point of sale system of a store.

In one embodiment of the invention the POS-system of the store has also information about number of products at the store and when a product is purchased (e.g. at the cashier) the total number of the products at the store is updated. This information of the POS-system can be compared to the number of products at the store determined by the means for reading RFID-tags. If the comparison reveals that the detected number of products from POS system and RFID-tag reading is not the same, a new attempt for determining the number of tags by reading the RFID-tags and/or an alarm can be made. The alarm can be made to the store personnel so that they can check the status of the products, e.g. are some products missing and/or stolen because POS-system has different total number of products when compared to the total number of products determined by reading the RFID-tags.

If the number of products found from inventory check doesn't correspond to the number of products in the POS-system, the inventory check can be automatically repeated once or multiple times. In one embodiment of the invention the inventory check is repeated if there is big difference in number of products in comparison with the data of POS-system, e.g. bigger difference than 1, 2, 3, 4 or 5 number of products.

When RFID reads and detects certain number of product the system is able to know the location of the products based on the electronic label to which the specific RFIDs are linked. The system can have information about the location of the base station on which area the electronic label can be found. Usually the RFID reading can be done in the area where the base station operates and the whole area of the store doesn't have to be searched. If the detected number of products is compared to the total number of products on POS-system and the comparison gives different results, the whole area of the store can be read with RFID reading so that also products can be found which are not in their correct places.

The electronic price label can be linked to or paired with the product and corresponding RFID-tag at any phase of manufacturing, transporting or storing the product.

The number of products can also be determined from the warehouse by reading RFID-tags of the products. In one embodiment of the invention it's only possible to determine the number of certain type of product in the warehouse but the location of the products in the warehouse is unknown because electronic labels are not used in the warehouse. In one embodiment it's possible to use electronic labels also in the warehouse and because the location of the electronic labels is stored to the system, the detected products which are linked to certain electronic label can be also located and this location information can be presented by the system to the user and/or e.g. a handheld device. It can also be indicated from the electronic label and/or handheld device which products should be taken from the warehouse to the store.

In one embodiment of the invention the products coming to the store or store warehouse can be grouped already by an electronic label connected to the products. In this case the electronic price label can be used as an information display which is able to show product related information e.g. how many products there should be, how many products have to be taken to the store, in which location of the store (e.g. location of the shelf, location on the shelf, number of the corridor) the products have to be placed.

The electronic price, inventory management and label system can also report the number and/or type of products at the store and automatically recommend that products would be brought from the warehouse to the store if the number of products at the store is low.

With the system of the invention it's possible to follow the sales of the products. The removal of the RFID-tag from the system during the payment event at the cashier removes the product from the inventory of the store and adds it to a list of sold products. It's also possible to change the prices after certain amount of time, e.g. with certain reduction rate (percentage).

The RFID-tags attached to products can also be used by the alarm system and the system is able to list the products which were stolen or which someone has tried to steal and also time instants for these events can be stored.

In one embodiment of the invention a tag of the alarm system attached to the product or arranged to the proximity of the product can be used as a tag which can be read by the system to determine the number of products in the space, e.g. store and/or warehouse. In this case separate RFID-tags are not necessarily needed.

In one embodiment of the invention if a product is reserved or sold but is still present in the shelf this can be indicated by the electronic label. This can be the case e.g. if the product has been sold through an online store but is not yet picked from the shelf. The indication can be shown in many ways as described earlier, e.g. by flickering the display, by a light source, by displaying that the number of the products is zero and/or by hiding the price information from the display.

RFID-tag is used in this description as an example of a remotely readable tag so all the examples and embodiments presented in the description, claims and figures are also working for other types of remotely readable tags and not just RFID-tags. In this regard, operations executed with RFID-tags and RFID-reader can be done with any remotely readable tags which presence can be detected by means for reading remotely readable tags.

The invention related to an electronic price, inventory management and label system, which comprises an electronic label system comprising at least one base station 102, 104 and electronic labels 120, 122, 134, 136, which are configured to communicate with the base station 102, 104 using two way communication. The system further comprises means for reading remotely readable tags, such as RFID-tags 124, 126, 138, which tags are attached to products 112, 114, 130, 140, 146. Certain electronic label 120, 122, 134, 136 is linked to remotely readable tags of certain products 112, 114, 130, 140, 146, and the system is configured to detect the number of certain product 112, 114, 130, 140, 146 in a space by using the means for reading remotely readable tags, and to identify the location of these products 112, 114, 130, 140, 146 based on the location of the electronic label 120, 122, 134, 136 linked to the product 112, 114, 130, 140, 146 and/or remotely readable tag of the product.

In one embodiment of the invention the information about location of an electronic label 120, 122, 134, 136 is stored in to the system.

In one embodiment of the invention the base station 104 of the electronic label system comprises means for reading remotely readable tags and/or the base station 102 is connected to means for reading remotely readable tags.

In one embodiment of the invention the means for reading remotely readable tags is a separate unit from the base station of the electronic price label system.

In one embodiment of the invention the base station 104 of the electronic label system comprises means for reading remotely readable tags and/or wherein means for reading remotely readable tags are comprised in the same unit with the base station.

In one embodiment of the invention means for reading remotely readable tags is configured to use the antenna 108 of the base station of the electronic price label system.

In one embodiment of the invention the means for reading remotely readable tags is an RFID-reader 106.

In one embodiment of the invention the electronic label system is a two-way radio frequency communication system or an infrared communication based system.

In one embodiment of the invention the system is configured to use the electronic label system to send the product related information to electronic labels 120, 122, 134, 136 and the electronic label is configured to present on its display the product related information received from the base station 102, 104.

In one embodiment of the invention the system is configured to detect the number of remotely readable tags within the coverage area of one base station 102, 104.

In one embodiment of the invention the system is configured to detect the number of remotely readable tags within the coverage area of all base stations.

In one embodiment of the invention the system is configured to stop the transmissions of the electronic labels before or when the system starts reading remotely readable tags attached to the products 112, 114, 130, 140, 146.

In one embodiment of the invention the system is configured to read remotely readable tags simultaneously with transmissions of the electronic labels 120, 122, 134, 136.

In one embodiment of the invention the system is configured to provide an alarm or notification if the determined number of certain product in the store and/or warehouse is below a predefined limit.

In one embodiment of the invention the alarm and/or notification is configured to be provided to an external system and/or handheld device with information about the location of the electronic label 120, 122, 134, 136.

In one embodiment of the invention the electronic label system is an electronic price label system.

In one embodiment of the invention the electronic label 120, 122, 134, 136 is configured to display on its display the determined number of products linked to the specific electronic label, the determined number of products being number of determined products in the store.

In one embodiment of the invention the electronic label 120, 122, 134, 136 is configured to display on its display the determined number of products linked to the specific electronic label, the determined number of products being number of determined products in the warehouse.

In one embodiment of the invention the electronic label 120, 122, 134, 136 is configured to indicate, e.g. by changing colors of the display and/or by a light source, that number of products linked to the specific electronic label is under a predefined limit.

The invention also relates to a method for an electronic price, inventory management and label system, which system comprises an electronic label system, comprising at least one base station 102, 104 and electronic labels 120, 122, 134, 136, which are configured to communicate with the base station 102, 104 using two way communication, the system further comprising means for reading remotely readable tags, such as RFID-tags 124, 126, 138, which are attached to products, wherein certain electronic label 120, 122, 134, 136 is linked to remotely readable tags of certain products 112, 114, 130, 140, 146. In the method the system detects the number of certain product 112, 114, 130, 140, 146 in a space by using the means for reading remotely readable tags, and identifies the location of these products 112, 114, 130, 140, 146 based on the location of the electronic label 120, 122, 134, 136 linked to the product 112, 114, 130, 140, 146 and/or remotely readable tag of the product.

In one embodiment of the invention information about location of an electronic label 120, 122, 134, 136 is stored in to the system.

In one embodiment of the invention the base station 104 of the electronic label system comprises means for reading remotely readable tags and/or the base station 102 is connected to means for reading remotely readable tags.

In one embodiment of the invention the means for reading remotely readable tags is a separate unit from the base station of the electronic price label system.

In one embodiment of the invention base station 104 of the electronic label system comprises means for reading remotely readable tags and/or wherein means for reading remotely readable tags are comprised in the same unit with the base station.

In one embodiment of the invention means for reading remotely readable tags use the antenna 108 of the base station of the electronic price label system.

In one embodiment of the invention means for reading remotely readable tags is an RFID-reader 106.

In one embodiment of the invention the electronic label system is a two-way radio frequency communication system or an infrared communication based system.

In one embodiment of the invention the system uses the electronic label system to send the product related information to electronic labels 120, 122, 134, 136 and the electronic label presents on its display the product related information received from the base station 102, 104.

In one embodiment of the invention the system detects the number of remotely readable tags within the coverage area of one base station 102, 104.

In one embodiment of the invention the system detects the number of remotely readable tags within the coverage area of all base stations.

In one embodiment of the invention the system stops the transmissions of the electronic labels before or when the system starts reading remotely readable tags attached to the products 112, 114, 130, 140, 146.

In one embodiment of the invention the system is configured to read remotely readable tags simultaneously with transmissions of the electronic labels 120, 122, 134, 136.

In one embodiment of the invention the system provides an alarm or notification if the determined number of certain product in the store and/or warehouse is below a predefined limit.

In one embodiment of the invention the alarm and/or notification is provided to an external system and/or handheld device with information about the location of the electronic label 120, 122, 134, 136.

In one embodiment of the invention electronic label system is an electronic price label system.

In one embodiment of the invention the electronic label 120, 122, 134, 136 displays on its display the determined number of products linked to the specific electronic label, the determined number of products being number of determined products in the store.

In one embodiment of the invention the electronic label 120, 122, 134, 136 displays on its display the determined number of products linked to the specific electronic label, the determined number of products being number of determined products in the warehouse.

In one embodiment of the invention the electronic label 120, 122, 134, 136 indicates, e.g. by changing colors of the display and/or by a light source, that number of products linked to the specific electronic label is under a predefined limit.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. An electronic price, inventory management and label system, comprising:
    an electronic label system, comprising at least one base station and electronic labels, wherein the electronic label system is configured to communicate with the at least one base station using two-way communication; and
    a tag reader configured to read remotely readable tags, each remotely readable tag being attached to a respective product,
    wherein each electronic label is linked to a respective remotely readable tag of a respective product,
    wherein the electronic price, inventory management and label system is configured to:
    perform an inventory check by:
        automatically turning off transmission of the electronic labels, and
        reading the electronic labels using the tag reader, wherein the electronic labels operate in a same frequency range as the tag reader;
    turning on the transmission of the electronic labels in response to the inventory check being complete, and
    identify a location of each product based on a location of the respective electronic label linked to each product, wherein the location of the respective electronic label is determined based on a location of the at least one base station which communicates with the respective electronic label,
    wherein the tag reader is configured to use an antenna of the at least one base station,
    wherein the electronic price, inventory management and label system is configured to provide an alarm or notification when the detected number of the products in the space is below a predefined limit, and
    wherein the alarm and/or notification is configured to be provided to an external system and/or a handheld device with information about the location of each electronic label.

2. The electronic price, inventory management and label system according to claim 1, wherein information about the location of each electronic label is stored in the electronic price, inventory management and label system.

3. The electronic price, inventory management and label system according to claim 1, wherein the at least one base station of the electronic label system comprises the tag reader and/or the at least one base station is connected to the tag reader.

4. The electronic price, inventory management and label system according to claim 1, wherein the tag reader is a separate unit from the at least one base station of the electronic price label system.

5. The electronic price, inventory management and label system according to claim 1, wherein the at least one base station of the electronic label system comprises the tag reader and/or the tag reader is comprised in a same unit with the at least one base station.

6. The electronic price, inventory management and label system according to claim 1, wherein the tag reader is an RFID-reader.

7. The electronic price, inventory management and label system according to claim 1, wherein the electronic label system is a two-way radio frequency communication system or an infrared communication based system.

8. The electronic price, inventory management and label system according to claim 1, wherein the electronic price, inventory management and label system is configured to use the electronic label system to send product related information to the electronic labels and the electronic label system is configured to present on its display the product related information received from the at least one base station.

9. The electronic price, inventory management and label system according to claim 1, wherein the electronic price, inventory management and label system is configured to detect a number of the remotely readable tags within a coverage area of the at least one base station.

10. The electronic price, inventory management and label system according to claim 1, wherein the electronic price, inventory management and label system is configured to detect a number of remotely readable tags within a coverage area of the at least one base station.

11. The electronic price, inventory management and label system according to claim 1, wherein the electronic price, inventory management and label system is configured to stop transmission of the electronic labels before or when the electronic price, inventory management and label system starts reading the remotely readable tags attached to the products.

12. The electronic price, inventory management and label system according to claim 1, wherein the electronic price, inventory management and label system is configured to read the remotely readable tags simultaneously with transmission of the electronic labels.

13. The electronic price, inventory management and label system according to claim 1, wherein the electronic label system is an electronic price label system.

14. The electronic price, inventory management and label system according to claim 1, wherein the electronic label system is configured to display on its display the detected number of the products, and
wherein the space including the detected number of products is a store.

15. The electronic price, inventory management and label system according to claim 1, wherein the electronic label system is configured to display on its display the detected number of the products, and
wherein the space including the detected number of the products is a warehouse.

16. The electronic price, inventory management and label system according to claim 1, wherein the electronic label system comprises a display and is configured to indicate, by changing colours of the display and/or a light source, that the number of the products is under a predefined limit.

17. A method for operating an electronic price, inventory, management and label system, comprising:
providing the electronic price, inventory management and label system, wherein the electronic price, inventory management and label system comprises:
an electronic label system, comprising at least one base station and electronic labels, wherein the electronic labels are configured to communicate with the at least one base station using two-way communication; and
a tag reader configured to read remotely readable tags, each remotely readable tag being attached to a respective product,
wherein each electronic label is linked to a respective remotely readable tag of a respective product;
performing an inventory check by:
automatically turning off transmission of the electronic labels, and
reading the electronic labels using the tag reader, wherein the electronic labels operate in a same frequency range as the tag reader;
turning on the transmission of the electronic labels in response to the inventory check being complete; and
identifying a location of each product based on a location of the respective electronic label linked to each product, wherein the location of the respective electronic label is determined based on a location of the at least one base station which communicates with the respective electronic label,
wherein the tag reader uses an antenna of the at least one base station,
wherein the electronic price, inventory management and label system provides an alarm or notification when the detected number of the products in the space is below a predefined limit, and
wherein the alarm and/or notification is provided to an external system and/or a handheld device with information about the location of each electronic label.

18. The method according to claim 17, the method further comprising storing information about a location of each electronic in the electronic price, inventory management and label system.

19. The method according to claim 17, wherein the at least one base station of the electronic label system comprises the tag reader and/or the at least one base station is connected to the tag reader.

20. The method according to claim 17, wherein the tag reader is a separate unit from the at least one base station.

21. The method according to claim 17, wherein the at least one base station comprises the tag reader and/or the tag reader is comprised in a same unit with the at least one base station.

22. The method according to claim 17, wherein the tag reader is an RFID-reader.

23. The method according to claim 17, wherein the electronic label system is a two-way radio frequency communication system or an infrared communication based system.

24. The method according to claim 17, wherein the electronic price, inventory management and label system uses the electronic label system to send the product related information to the electronic labels and the electronic label system presents on its display the product related information that is received from the at least one base station.

25. The method according to claim 17, wherein the electronic price, inventory management and label system detects a number of the remotely readable tags within a coverage area of the at least one base station.

26. The method according to claim 17, wherein the electronic price, inventory management and label system detects a number of the remotely readable tags within a coverage area of the at least one base station.

27. The method according to claim 17, wherein the electronic price, inventory management and label system stops transmission of the electronic labels before or when the electronic price, inventory management and label system starts reading the remotely, readable tags attached to the respective products.

28. The method according to claim 17, wherein the electronic price, inventory management and label system is configured to read the remotely readable tags simultaneously with transmission of the electronic labels.

29. The method according to claim 17, wherein electronic label system is an electronic price label system.

30. The method according to claim 17, wherein the electronic label displays on its display the detected number of the products, and wherein the space is a store.

31. The method according to claim 17, wherein the electronic label system displays on its display the detected number of the products, and wherein the space is a warehouse.

32. The method according to claim 17, wherein the electronic label indicates, by changing colours of the display and/or by a light source, that number of products linked to the specific electronic label is under a predefined limit.

* * * * *